Nov. 9, 1948.    F. D. MOYER    2,453,154
LOCKING DEVICE
Filed July 3, 1946
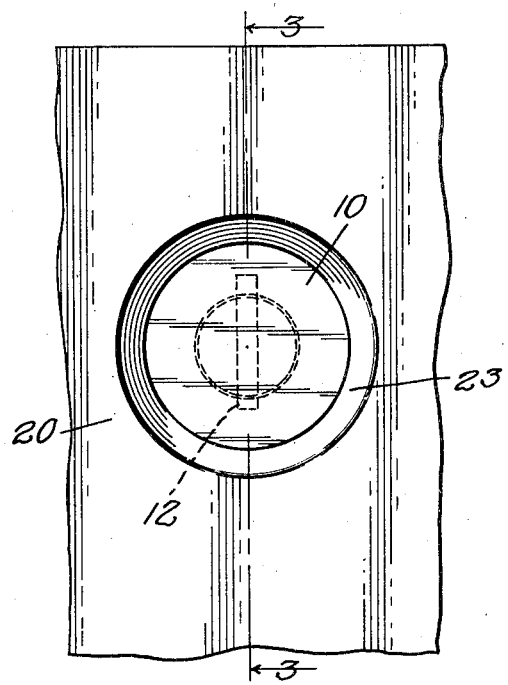
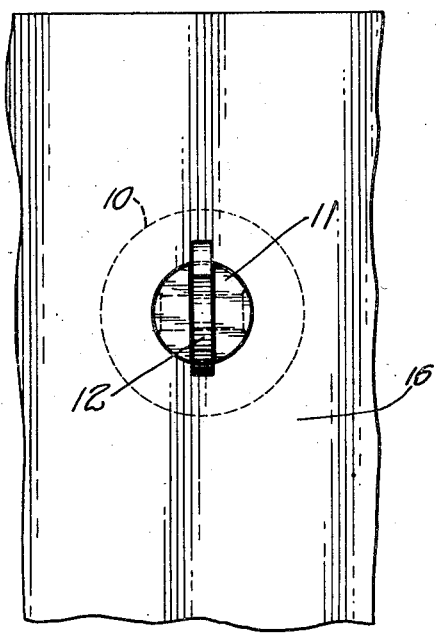
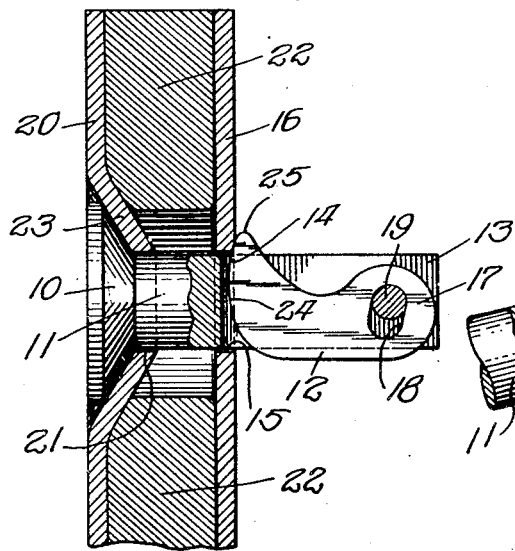
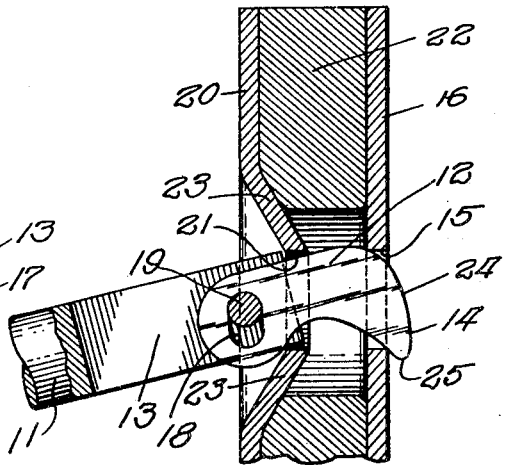
Inventor:
Fred D. Moyer Patented Nov. 9, 1948

2,453,154

UNITED STATES PATENT OFFICE 2,453,154

LOCKING DEVICE

Frederick D. Moyer, Chicago, Ill., assignor to Chicago Bridge & Iron Company, a corporation of Illinois Application July 3, 1946, Serial No. 681,261

3 Claims. (Cl. 85—3)

This invention relates to a locking device for locking together at least two pieces of material having substantially aligned holes or openings therein.

Where two pieces of material such as pieces of sheet metal or the like are to be locked together it has been common practice to punch holes in the metal and fasten the pieces together with bolts or other types of permanent or semi-permanent fasteners. This provides a tight lock for the sheets, but the bolts are sometimes difficult to remove, and are rather laborious to install. I have invented a new type locking device that can readily be inserted through aligned holes and that can be operated very quickly to lock the two members together. This new locking device comprises a head portion, a shank portion, and a wedge rotatably mounted on the free end of the shank. The device can be inserted through the holes, and the wedge turned back upon the shank so that the wedging face of the wedge presses against one sheet of material and holds all sheets tightly bound between the wedging face and the head.

The invention will be described as related to the embodiment shown in the accompanying drawings. Of the drawings Fig. 1 is a plan view of the locking device from the head end; Fig. 2 is a similar plan view, but taken from the wedge end; Fig. 3 is a vertical section taken along line 3—3 of Fig. 1; and Fig. 4 is a vertical section similar to Fig. 3 showing the locking device being inserted through aligned holes.

The new locking device is applicable for locking together two or more sections of any material. It is particularly useful for locking two pieces of sheet metal with a soft resilient material between them. This particular application is shown and described in my copending application Serial No. 681,262, filed July 3, 1946.

The locking device which is the subject of this invention comprises a head portion 10, a shank 11, and a locking wedge 12 rotatably mounted on the free end of the shank 11. The shank is provided with a longitudinal slot 13 at its free end that extends into the shank to a depth greater than the effective length of the wedge 12.

The locking wedge portion 12 has its free end 14 of substantially arcuate shape with the outer surface of this free end longer than the diameter of the corresponding hole 15 in a sheet of material 16, such as metal. The wedge 12 has every cross section shorter than the dimension of the hole 15. The free end 14 of the wedge 12 is in the shape of a shallow hook.

The attached end 17 of the wedge 12 is provided with a transverse slot 18 through which passes a pin 19 extending from side to side of the shank slot 13. An elongated slot aids in inserting the locking device through the holes, as is illustrated in Fig. 4.

In Fig. 3 there is illustrated a typical use of the wedging device. Here an outer sheet of metal 20 having a hole 21 therein is assembled with an inner sheet of metal 16 having a corresponding hole 15. Between the two sheets there is located a mass 22 of expanded or sponge synthetic rubber. There is provided a counter-sunk area 23 in the outer sheet 20 surrounding the hole 21 so that the outer surface of the head 10 will be flush with the sheet. After the locking device has been inserted through the holes 21 and 15 as shown in Fig. 4 the wedge 12 is turned back toward the sheet 16 of metal so that the wedging surface 24 extends across the hole 15 and the inner sheet of metal. This serves to hold the locking device in place.

In order that the sheets will be held tightly locked together the effective length of the shank between the head 10 and the wedging surface 24 is slightly shorter than the distance between the outer edges of the two holes 15 and 21. When the locking device has been inserted through the holes the wedge 12 is turned in a counter-clockwise direction, as shown in Fig. 4, and the point 25 of the wedge is hammered to force the wedge into position as shown in Fig. 3.

Having described my invention as related to the embodiment shown in the accompanying drawings, it is my intention that the invention be not limited by the details of description unless otherwise specified, but rather be construed broadly within its spirit and scope as set out in the accompanying claims.

I claim:

1. A locking device for locking together at least two pieces of material having substantially aligned holes, said device comprising a head portion, a shank, and a locking wedge rotatably mounted at one end on the end of the shank opposite the head, said locking wedge having its free end of arcuate shape and having an outer surface at its free end longer than the diameter of the corresponding hole in one piece of said material with said free end extending across the hole when the wedge is turned back toward the hole, the wedge being insertable through said holes, and the effective length of the shank between the head and the free end of the wedge when the wedge is in said turned-back position being slightly smaller than the distance between the outer surfaces of the material adjacent the holes with which said wedge is to be used.

2. The locking device of claim 1 wherein the wedge is mounted in a longitudinal slot at the end of the shank opposite the head, said slot being deeper than the effective length of the wedge.

3. The locking device of claim 1 wherein there is provided a longitudinal slot at the end of the shank opposite the head greater in depth than the effective length of the wedge, a pin extending across said slot and also through a transverse slot in the wedge.

FREDERICK D. MOYER.

REFERENCES CITED

The following references are of record in the file of this patent:

UNITED STATES PATENTS

| Number | Name | Date |
| --- | --- | --- |
| 1,409,626 | Walther | Mar. 14, 1922 |
| 2,398,962 | Randrup | Apr. 23, 1946 |